United States Patent
Bailey (10) Patent No.: US 11,021,972 B2
(45) Date of Patent: Jun. 1, 2021

(54) VARIABLE PITCH BLADE HOLDER FOR GAS TURBINE ENGINE

(71) Applicant: Rolls-Royce North American Technologies Inc., Indianapolis, IN (US)

(72) Inventor: Patrick Bailey, Lebanon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 278 days.

(21) Appl. No.: 16/103,407

(22) Filed: Aug. 14, 2018

(65) Prior Publication Data

US 2020/0056490 A1 Feb. 20, 2020

(51) Int. Cl.
| | | |
|---|---|---|
| *F01D 5/30* | (2006.01) | |
| *F01D 5/28* | (2006.01) | |
| *F01D 7/00* | (2006.01) | |
| *F04D 29/32* | (2006.01) | |

(52) U.S. Cl.
CPC ........... *F01D 5/3007* (2013.01); *F01D 5/282* (2013.01); *F01D 7/00* (2013.01); *F04D 29/322* (2013.01); *F05D 2240/20* (2013.01); *F05D 2240/80* (2013.01); *F05D 2260/941* (2013.01); *F05D 2300/603* (2013.01)

(58) Field of Classification Search
CPC ........ F01D 5/3007; F01D 7/00; F01D 5/3084; F01D 5/3015; F05D 2260/941; F05D 2240/20; F05D 2260/38; F05D 2220/36; F04D 29/322; F04D 29/323; F04D 29/34; F04D 29/36; F04D 29/362; B64C 11/06
See application file for complete search history.

(56) References Cited

U.S. PATENT DOCUMENTS

| | | | | |
|---|---|---|---|---|
| 3,809,495 | A | * 5/1974 | Stahl | ..................... F01D 5/3084 416/135 |
| 4,019,832 | A | 4/1977 | Salemme et al. | |
| 4,047,840 | A | * 9/1977 | Ravenhall | ............. F04D 29/323 416/135 |
| 4,685,863 | A | 8/1987 | McLean | |
| 5,263,898 | A | 11/1993 | Elston, III et al. | |
| 8,734,101 | B2 | * 5/2014 | McDonald | ............ F04D 29/023 415/209.4 |
| 8,801,385 | B2 | 8/2014 | Fabre | |

(Continued)

FOREIGN PATENT DOCUMENTS

| | | |
|---|---|---|
| EP | 1048821 A2 | 11/2000 |
| EP | 2241872 A2 | 10/2010 |

(Continued)

OTHER PUBLICATIONS

Translation of FR 2996590 A1 courtesy of espacenet.com (Year: 2014).*

(Continued)

*Primary Examiner* — David E Sosnowski
*Assistant Examiner* — Danielle M. Christensen
(74) *Attorney, Agent, or Firm* — Barnes & Thornburg LLP (57) ABSTRACT

A variable pitch blade holder for use with a gas turbine engine. The variable pitch blade holder is configured to retain a blade and to rotate about a center axis with the blade during operation of the gas turbine engine. The blade holder is adapted to rotate about a pitch change axis to vary a pitch of the blade.

18 Claims, 4 Drawing Sheets

(56) References Cited

U.S. PATENT DOCUMENTS

2011/0110785 A1    5/2011   Kreiselmaier et al.
2011/0206530 A1    8/2011   Fabre
2016/0115821 A1    4/2016   Anderson

FOREIGN PATENT DOCUMENTS

EP    2669478 A1      12/2013
FR    2996590 A1 *    4/2014   ............. B64C 11/06

OTHER PUBLICATIONS

Extended European Search Report, European Application No. 19190919.1-1004, dated Apr. 29, 2020, 14 pages.

* cited by examiner

VARIABLE PITCH BLADE HOLDER FOR GAS TURBINE ENGINE

STATEMENT REGARDING FEDERALLY SPONSORED RESEARCH OR DEVELOPMENT

Embodiments of the present disclosure were made with government support under NASA Contract No. NNC14CA29C (Phase III). The government may have certain rights.

FIELD OF THE DISCLOSURE

The present disclosure relates generally to fan blade assembly, and more specifically to a fan blade restraint that limits movement of the fan blade due to centrifugal forces.

BACKGROUND

Gas turbine engines are used to power aircraft, watercraft, power generators, and the like. Gas turbine engines typically include a fan, a compressor, a combustor, and a turbine. The compressor compresses air drawn into the engine by the fan and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left over products of the combustion are exhausted out of the turbine and may provide thrust in some applications.

The fan assembly generally includes a hub having a plurality of fan blades that rotate about a center axis of the gas turbine engine. Some fixed pitch dovetail fan blades require adjacent blade exerting forces on the dovetail surfaces to prevent any bending of the disc lug posts. In a variable pitch fan blade, each blade is independent of each other therefore the prying force to open the dovetail has no counteracting force. This characteristic of some variable pitch fans can present design challenges when distributing prying force.

SUMMARY

The present disclosure may comprise one or more of the following features and combinations thereof.

A variable pitch fan blade assembly for use with a gas turbine engine is disclosed in this paper. The variable pitch fan blade assembly may include a fan blade and a blade holder. The fan blade may comprise composite materials and may be configured to rotate about a center axis during operation of the gas turbine engine. The fan blade can include a dovetail shaped root and an airfoil that extends radially away from the dovetail shaped root relative to the center axis. The fan blade holder may comprise metallic material and may be configured to retain the fan blade as the fan blade rotates about the center axis. The blade holder may further be adapted to rotate selectively about a pitch change axis that extends perpendicular to the center axis to vary a pitch of the fan blade.

In illustrative embodiments, the blade holder may include a shank that extends along the pitch change axis and a blade restraint coupled to the shank for movement therewith. The blade restraint may include a base, a first post, and a second post that cooperate to define a dovetail shaped blade receiver slot that extends through the blade restraint and receives the fan blade to block radial movement of the fan blade out of the blade receiver slot relative to the center axis. The first post may be shaped to define a first relief slot that extends radially relative to the center axis through the first post and opens into the blade receiver slot. The second post may be shaped to define a second relief slot that extends radially relative to the center axis through the second post and opens into the blade receiver slot. The first and the second relief slot, therefore, may allow the first post and the second post to deform and distribute contact pressure along the dovetail shaped root of the fan blade in response to the fan blade being urged radially outward relative to the center axis by centrifugal forces acting on the fan blade during operation of the gas turbine engine.

In illustrative embodiments, the first post may include an outer wall that extends radially away from the base relative the center axis, a join wall that extends from the outer wall, and an inner wall that extends radially from the join wall toward the base relative to the center axis to define a portion of the first relief slot and the inner wall is cantilevered from the join wall. The inner wall of the first post may include an engagement surface that faces the dovetail shaped root of the fan blade and an interior surface opposite the engagement surface and the engagement surface is planar. The engagement surface may be continuous such that it is formed without holes.

In illustrative embodiments, the inner wall is spaced apart from the outer wall to locate the first relief slot therebetween. The first relief slot may include an opening that faces the second post. The outer wall may be thicker than the inner wall. The outer wall, the join wall, and the inner wall may be solid and/or may be integrally formed.

In illustrative embodiments, the first post may be hook shaped. Moreover, in some embodiments, the second post may be hook shaped.

In illustrative embodiments, the blade restraint may have a front face and a rear face that is spaced apart from the front face. The first post and the second post may extend between the front face and the rear face. The first relief slot and the second relief slot may extend through the front face and the rear face.

According to another aspect of the present disclosure, a variable pitch fan blade assembly may include a blade holder. The blade holder may include includes a shank and a blade restraint. The shank may extend along a pitch change axis about which the blade holder is configured to rotate. The blade restraint may include a base coupled to the shank for rotation therewith, a first post that extends away from the base, and a second post that extends away from the base. The first post may be spaced apart from the second post to define a blade receiver slot between the first post and the second post.

In illustrative embodiments, the first post may be hook shaped to define a first relief slot that extends axially relative to the pitch change axis through the first post and that opens into the blade receiver slot. Moreover, the second post may be hook shaped to define a second relief slot that extends axially relative to the pitch change axis through the second post and that opens into the blade receiver slot.

In illustrative embodiments, the first post includes an outer wall, a join wall, and an inner wall. The outer wall may extend axially away from the base. The join wall may extend between and interconnect the outer wall with the inner wall. The inner wall may extend away from the join wall and toward the base such that the outer wall, the join wall, and the inner wall define the first relief slot.

In illustrative embodiments, the inner wall includes a first end that may extend from the join wall and a second end that is free such that the inner wall is cantilevered from the join wall. In some embodiments, the inner wall of the first post includes an engagement surface that faces the second post and an interior surface that faces the first relief slot and the engagement surface is planar. The outer wall, the join wall, and the inner wall can be solid and/or can be integrally formed.

In illustrative embodiments, the blade receiver slot defined by the base, the first post, and the second post is dovetail shaped. The blade restraint may include a front face and a rear face spaced apart from the front face. The blade receiver slot, the first relief slot, and the second relief slot may extend through the front face and the rear face of the blade restraint. The first relief slot may be L shaped and may have an opening that faces the second post.

In illustrative embodiments, the assembly may also include a fan blade. The fan blade may include a root and an airfoil that extends away from the root. The root is received in the blade receiver slot. The first post and the second post can cooperate to block the root from moving radially out of the blade receiver slot. The root may be dovetail shaped and may include a first planar mating surface that faces the first post and a second planar mating surface that faces the second post.

In illustrative embodiments, the first post can include a fixed end coupled to the base and a free end spaced apart from the fixed end. A thickness of the first post can taper down from the fixed end to the free end.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
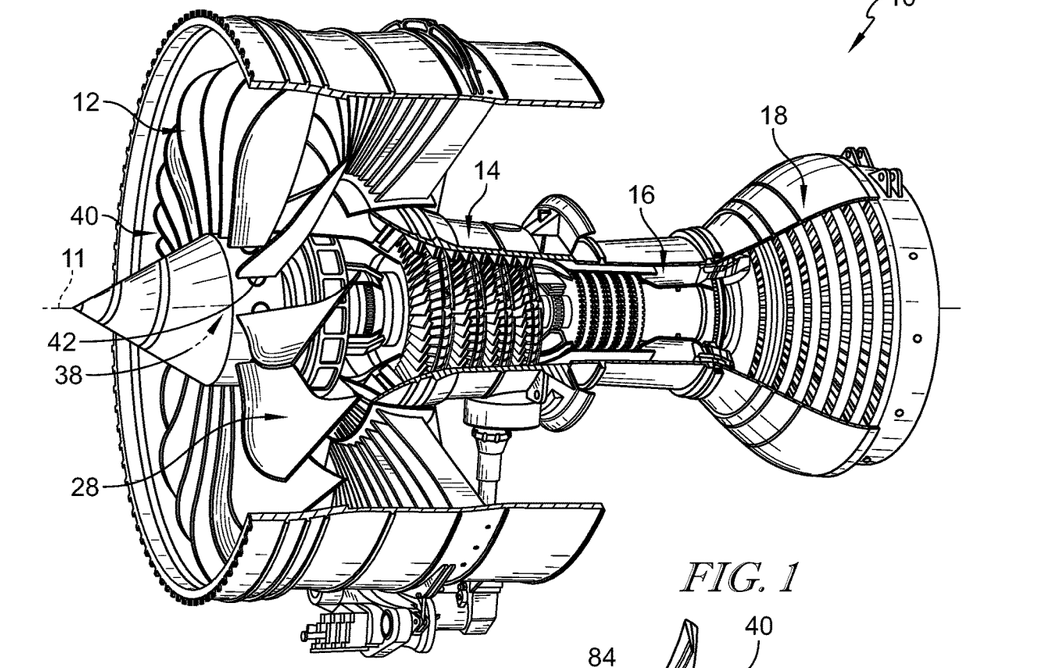
FIG. 1 is a cutaway view of a gas turbine engine that includes a variable pitch fan, a compressor, a combustor, and a turbine, the variable pitch fan including a plurality of fan blade assemblies mounted for rotation about an axis of the gas turbine engine to produce thrust and configured to have their pitch varied during operation of the gas turbine engine.

A gas turbine engine 10 in accordance with the present disclosure is shown in FIG. 1. The gas turbine engine 10 includes a variable pitch fan 12, a compressor 14, a combustor 16, and a turbine 18. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 to cause the turbine 18 to rotate about a center axis 11 of the gas turbine engine 10 and drive the compressor 14 and the fan 12.

The illustrative fan 12 is a variable pitch fan 12 that includes a plurality of fan blade assemblies 40 extending from a hub 38 and that each include a fan blade holder 42 and a fan blade 28 mounted in the fan blade holder 42. The fan blade assembly 40 is configured to rotate about the center axis 11 as suggested in FIG. 1 such that the fan blades 28 produce thrust. The fan blade assemblies 40 are arranged circumferentially about the center axis 11 and are configured to rotate about corresponding radially extending fan blade pivot axes 30 to change a pitch (sometimes called an incident angle) of the fan blades 28.

As one example, the pitch of the fan blades 28 may be varied to optimize fuel burn throughout a flight mission. The pitch of the fan blades 28 may be reversed to provide thrust reverse and reduce or eliminate the use of heavy thrust reverse units coupled to the engine nacelle. The fan blades 28 may be feathered in the event of an engine failure to reduce drag or windmill loads.

Figure 2:
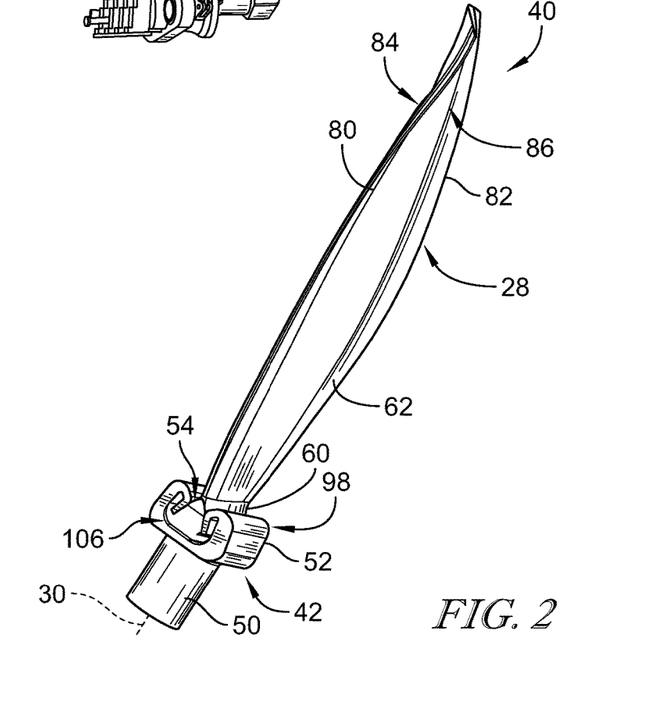
FIG. 2 is a perspective view of one of the fan blade assemblies of FIG. 1 showing that the fan blade assembly includes a fan blade holder and a fan blade received in a slot formed in the fan blade holder.

Referring to FIG. 2, a fan blade assembly 40 includes the fan blade holder 42 and the fan blade 28. The fan blade holder 42 includes a metallic material and is configured to retain the fan blade 28 as the fan blade 28 rotates about the center axis 11. The fan blade 28 may be a composite material, e.g. organic composite or carbon composite. The fan blade holder 42 is adapted to rotate selectively about the fan blade pivot axis 30 to vary a pitch of the fan blade 28.

The fan blade holder 42 includes a shank 50 and a blade restraint 52 that extends between a rear face 98 and a front face 106. The shank 50 is generally cylindrical in shape and extends along the fan blade pivot axis 30. The shank 50 is configured to position in an opening of the hub 38. The shank 50 rotates about the fan blade pivot axis 30 within the opening of the hub 38. The blade restraint 52 extends radially outward from the shank 50 and includes a dovetail shaped blade receiver slot 54.

The fan blade 28 includes a composite material and is configured to rotate about the center axis 11 during operation of the gas turbine engine 10. The fan blade 28 includes a dovetail shaped root 60 and an airfoil 62 extending radially outward from the root 60. The root 60 is positioned within the blade receiver slot 54 so that the fan blade 28 is secured to the fan blade holder 42.

Figure 3:
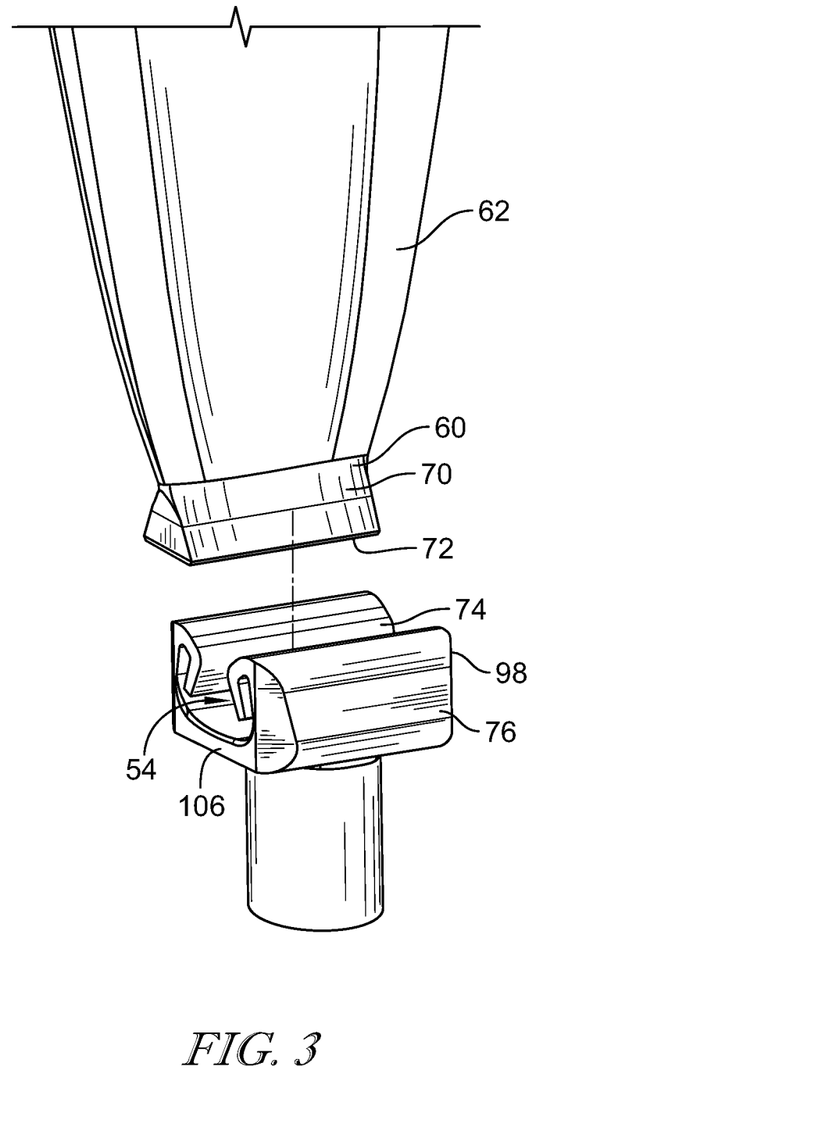
FIG. 3 is an exploded view of one of the fan blade assemblies of FIG. 1 showing the fan blade removed from the slot formed in the fan blade holder.

Referring to FIG. 3, the root 60 of the fan blade 28 has a pair of angled mating surfaces 70 extending from a bottom surface 72 to the airfoil 62. The root 60 is positioned within the blade receiver slot 54 so that the angled mating surfaces 70 engage a post 74 and a post 76 of the fan blade holder 42.

Referring back to FIG. 2, the airfoil 62 includes a leading edge 80 and an opposite trialing edge 82. A suction side 84 of the airfoil 62 extends between the leading edge 80 and the trialing edge 82. A pressure side 86 of the airfoil 62 extends between the leading edge 80 and the trialing edge 82 opposite the suction side 84.

Figure 4:
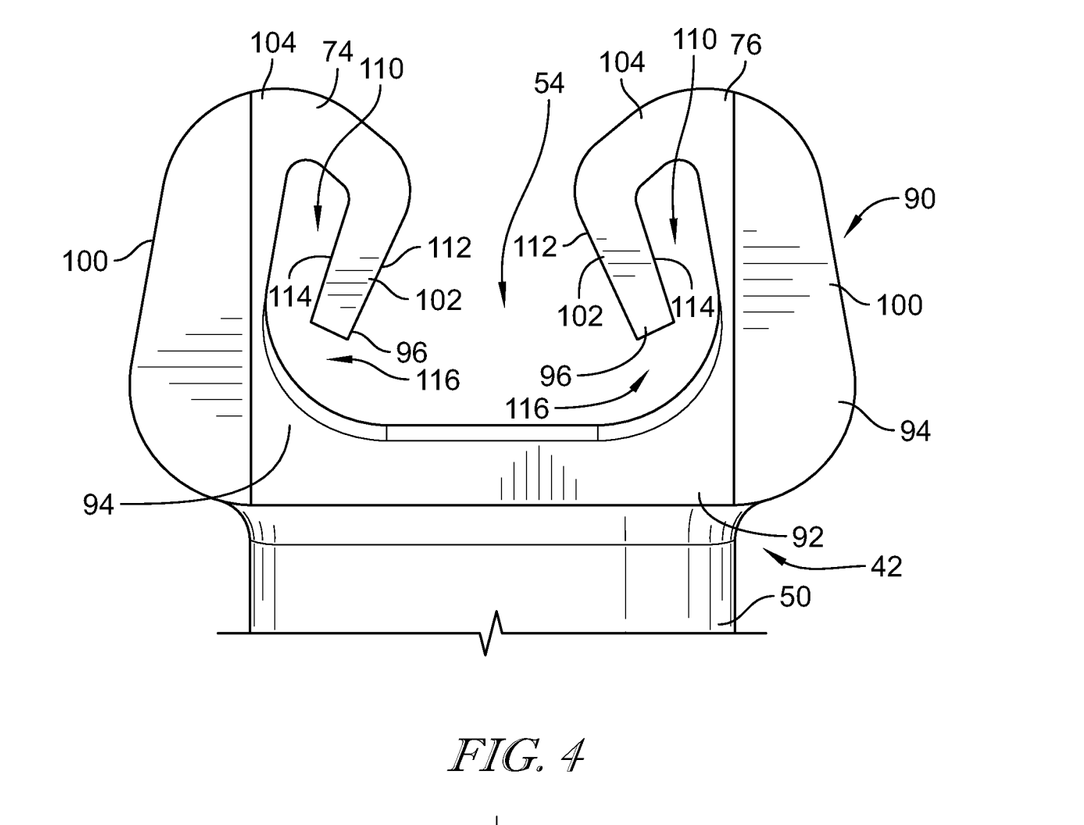
FIG. 4 is a side plan view of the fan blade holder of FIG. 2 showing that the fan blade holder includes a shank and a blade restraint extending radially outward from the shank.

Referring to FIG. 4, the fan blade holder 42 includes the shank 50 and a blade restraint 90 that extends radially outward from the shank 50. The blade restraint 90 includes a base 92. The posts 74 and 76 are generally hook shaped and extend radially outward from the base 92 so that the posts 74, 76 and the base 92 define the blade receiver slot 54. The posts 74, 76 extend between the rear face 98 and the front face 106 of the blade restraint 90. Each post 74, 76 includes a fixed end 94 coupled to the base 92 and a free end 96. The free end 96 is positioned radially outward from the fixed end 94.

Each post 74, 76 includes an outer wall 100 and an inner wall 102 coupled by a join wall 104, the outer wall 100 being thicker than the inner wall 102. The outer wall 100, the join wall 104, and the inner wall 102 are solid and integrally formed. The outer wall 100 extends radially outward from the base 92. The join wall 104 extends at an angle relative to the outer wall 100 toward the opposite post 74, 76. The join wall 104 extends at an orthogonal angle relative to the outer wall 100. The inner wall 102 extends radially inward from the join wall 104 into the blade receiver slot 54. The inner wall 102 is cantilevered from the join wall 104.

A relief slot 110 is defined between the outer wall 100 and the inner wall 102. The relief slot extends through the front face 106 and the rear face 98. That is, the inner wall 102 is spaced apart from the outer wall 100 to locate the relief slot 110 therebetween. The relief slot 110 extends radially relative to the center axis 11 through the post 74, 76 and opens into the blade receiver slot 54. Each relief slot 110 is L shaped and includes an opening 116 that faces the opposite post 74, 76. The relief slots 110 enable the posts 74, 76 to deform and distribute contact pressure along the mating surfaces 70 of the dovetail shaped root 60 in response to the fan blade 28 being urged radially outward relative to the center axis 30 by centrifugal forces acting on the fan blade 28 during operation of the gas turbine engine 10.

The inner wall 102 includes a planar engagement surface 112 and an inner surface 114. The engagement surface 112 is continuous such that it is formed without holes. The blade receiver slot 54 is defined between the engagement surfaces 112 of the posts 74, 76. The relief slot 110 is defined between the inner surface 114 and the outer wall 100. The engagement surface 112 is configured to engage the root 60 of the fan blade 28. Particularly, an angled mating surface 70 of the root 60 is configured to engage the engagement surface 112 of each post 74, 76 when the fan blade 28 is coupled to the fan blade holder 42 to block radial movement of the fan blade 28 out of the blade receiver slot 54 relative to the center axis 11.

Figure 5:
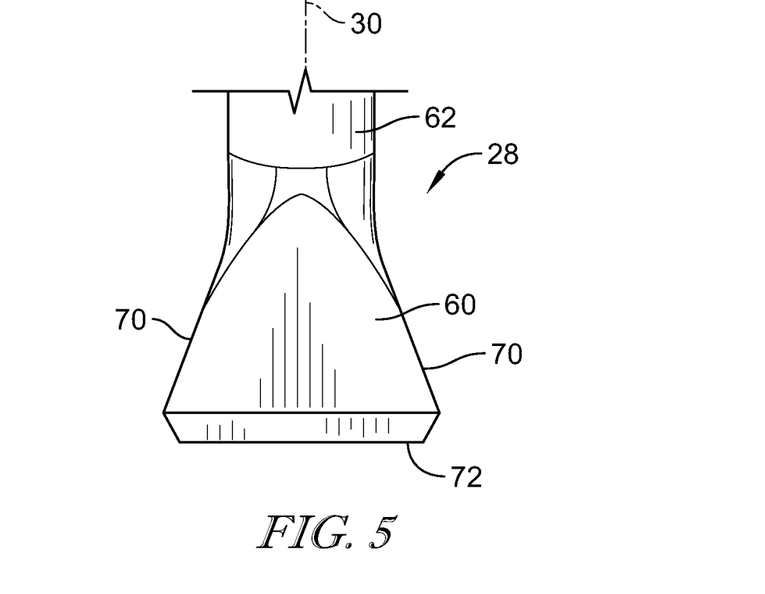
FIG. 5 is a side plan view of the fan blade of FIG. 2 showing that the fan blade includes a root and an airfoil extending radially outward from the root.

As shown in FIG. 5, the fan blade 28 includes the root 60 extending radially inward from the airfoil 62. The mating surfaces 70 extend at an angle relative to the fan blade pivot axis 30. That is, the root 60 narrows from the bottom surface 72 moving radially outward to the airfoil 62. The angle of the mating surfaces 70 substantially mirrors the angle of the engagement surfaces 112 (shown in FIG. 4) of the blade restraint 90.

Figure 6:
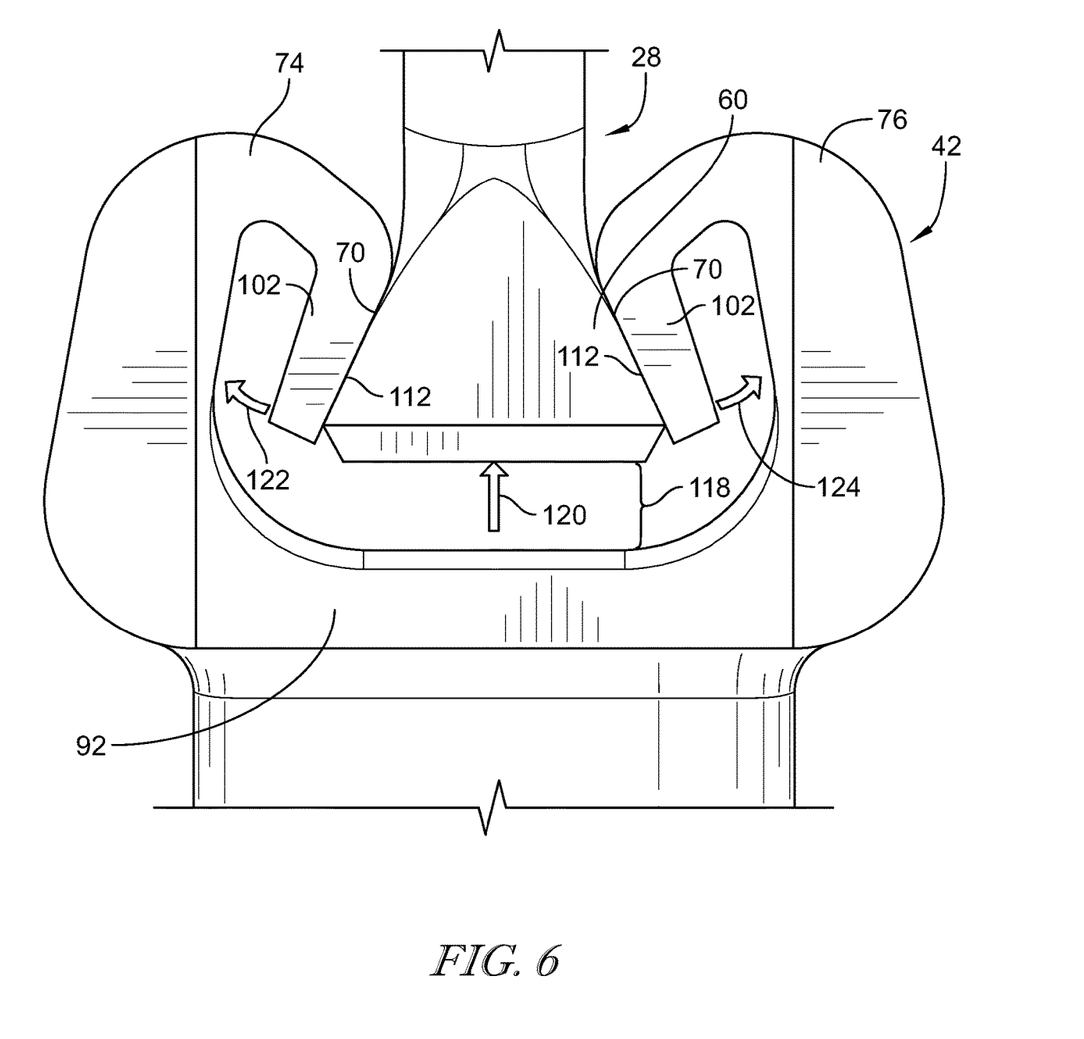
FIG. 6 is a side plan view of the fan blade assembly of FIG. 2 showing centrifugal forces acting on the fan blade to move the fan blade radially outward relative to the fan blade holder.

Referring to FIG. 6, the fan blade 28 is positioned with the fan blade holder 42 so that as air gap 118 is formed between the root 60 of the fan blade 28 and the base 92 of the fan blade holder 42. When the gas turbine engine 10 is operated, centrifugal forces act on the fan blade 28 in the direction of arrow 120. These forces move the fan blade 28 radially outward causing stresses to be created between the mating surfaces 70 of the root 60 and the engagement surfaces 112 of the posts 74, 76. Generally, these stresses may be non-uniform resulting in an uneven distribution of stress on the posts 74, 76. The uneven distribution of stress results in pressure points that may cause failures of the posts 74, 76, thereby resulting in the fan blade 28 becoming dislodged from the blade restraint 52.

To uniformly distribute the forces acting between the blade restraint 52 and the root 60, the inner walls 102 of the posts 74, 76 deform outward in the direction of arrows 122, 124. That is, the inner walls 102 deform into the relief slots 110. The inner walls 102 are deformed so that the mating surfaces 70 of the root 60 maintain a substantially uniform engagement with the engagement surfaces 112. The uniform engagement results in the stresses being uniformly distributed across the engagement surfaces 112 to reduce the occurrence of pressure points on the posts 74, 76, thereby limiting failures in the blade restraint 52. It should be noted that the inner walls 102 deform to a point that uniformly distributes the stress while retaining the fan blade 28 in the fan blade holder 42.

As noted earlier, in many variable pitch fan blade designs, each blade is independent of each other therefore the prying force to open the dovetail has no counteracting force. This exerts force on the dovetail that not only creates high bending forces, but generates edge loading on the corners of the dovetail. Given solidity constraints at the hub, there is less bearing area to support the dovetail blade load. Point loading and edge of bedding have been a consistent problem in composite blade design. This edge loading can cause initiation of failure on composite root designs. This failure can propagate quickly under blade vibrations.

As will be appreciated from the above disclosure, the embodiments described herein adapt a dovetail fan blade design into a fan blade holder that can rotate about a pitch change axis. In some dovetail fan blade designs, the ears of the dovetail pry open as the blade slides outward due to the centrifugal load. This prying effect creates end loading on the bottom of the dovetail surface. This contact pressure can exceed the limit criteria for compressive stresses. In the embodiments described above, the contact pressures can be more uniform. The embodiments described above can be tuned to further smooth the gradient of the contact pressures created.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A variable pitch fan blade assembly for use with a gas turbine engine, the variable pitch fan blade assembly comprising
 a fan blade comprising composite material and configured to rotate about a center axis during operation of the gas turbine engine, the fan blade including a dovetail shaped root and an airfoil that extends radially away from the dovetail shaped root relative to the center axis, and
 a fan blade holder comprising metallic material and configured to retain the fan blade as the fan blade rotates about the center axis and the blade holder adapted to rotate selectively about a pitch change axis that extends perpendicular to the center axis to vary a pitch of the fan blade, the blade holder including a shank that extends along the pitch change axis and a blade restraint coupled to the shank for movement therewith, the blade restraint includes a base, a first post, and a second post that cooperate to define a dovetail shaped blade receiver slot that extends through the blade restraint and receives the fan blade to block radial movement of the fan blade out of the blade receiver slot relative to the center axis, wherein the first post is shaped to define a first relief slot that extends radially relative to the center axis through the first post and opens into the blade receiver slot and the second post is shaped to define a second relief slot that extends radially relative to the center axis through the second post and opens into the blade receiver slot to allow the first post and the second post to deform and distribute contact pressure along the dovetail shaped root of the fan blade in response to the fan blade being urged radially outward relative to the center axis by centrifugal forces acting on the fan blade during operation of the gas turbine engine, wherein the first post includes an outer wall that extends radially away from the base relative the center axis, a join wall that extends from the outer wall, and an inner wall that extends radially from the join wall toward the base relative to the center axis to define a portion of the first relief slot and the inner wall is cantilevered from the join wall.

2. The variable pitch fan blade assembly of claim 1, wherein the inner wall of the first post includes an engagement surface that faces the dovetail shaped root of the fan blade and an interior surface opposite the engagement surface and the engagement surface is planar.

3. The variable pitch fan blade assembly of claim 2, wherein the engagement surface is continuous such that it is formed without holes.

4. The variable pitch fan blade assembly of claim 1, wherein the inner wall is spaced apart from the outer wall to locate the first relief slot therebetween.

5. The variable pitch fan blade assembly of claim 4, wherein the first relief slot includes an opening that faces the second post.

6. The variable pitch fan blade assembly of claim 1, wherein the outer wall is thicker than the inner wall.

7. The variable pitch fan blade assembly of claim 1, wherein the outer wall, the join wall, and the inner wall are solid and are integrally formed.

8. The variable pitch fan blade assembly of claim 1, wherein the first post is hook shaped and the second post is hook shaped.

9. The variable pitch fan blade assembly of claim 1, wherein the blade restraint has a front face and a rear face that is spaced apart from the front face, the first post and the second post extend between the front face and the rear face, and the first relief slot and the second relief slot extend through the front face and the rear face.

10. A variable pitch fan blade assembly for use with a gas turbine engine comprising a blade holder that includes a shank and a blade restraint, the shank extends along a pitch change axis about which the blade holder is configured to rotate, wherein the pitch change axis extends perpendicular to a center axis of the gas turbine engine, the blade restraint includes a base coupled to the shank for rotation therewith, a first post that extends away from the base, and a second post that extends away from the base, the first post being spaced apart from the second post to define a blade receiver slot between the first post and the second post, wherein the first post is hook shaped to define a first relief slot that extends axially relative to the pitch change axis through the first post and opens into the blade receiver slot and the second post is hook shaped to define a second relief slot that extends axially relative to the pitch change axis through the second post and opens into the blade receiver slot, wherein the first post includes an outer wall, a join wall, and an inner wall, the outer wall extends axially away from the base, the join wall extends between and interconnects the outer wall and the inner wall, and the inner wall extends away from the join wall and toward the base such that the outer wall, the join wall, and the inner wall define the first relief slot.

11. The variable pitch fan blade assembly of claim 10, wherein the inner wall includes a first end that extends from the join wall and a second end that is free such that the inner wall is cantilevered from the join wall.

12. The variable pitch fan blade assembly of claim 10, wherein the inner wall of the first post includes an engagement surface that faces the second post and an interior surface that faces the first relief slot and the engagement surface is planar.

13. The variable pitch fan blade assembly of claim 10, wherein the outer wall, the join wall, and the inner wall are solid and are integrally formed.

14. The variable pitch fan blade assembly of claim 10, wherein the blade receiver slot defined by the base, the first post, and the second post is dovetail shaped.

15. The variable pitch fan blade assembly of claim 10, wherein the blade restraint includes a front face and a rear face spaced apart from the front face and the blade receiver slot, the first relief slot, and the second relief slot extend through the front face and the rear face of the blade restraint.

16. The variable pitch fan blade assembly of claim 10, further comprising a fan blade that includes a root and an airfoil that extends away from the root, the root is received in the blade receiver slot, the first post and the second post cooperate to block the root from moving radially out of the blade receiver slot, and the root is dovetail shaped and includes a first planar mating surface that faces the first post and a second planar mating surface that faces the second post.

17. A variable pitch fan blade assembly for use with a gas turbine engine comprising a blade holder that includes a shank and a blade restraint, the shank extends along a pitch change axis about which the blade holder is configured to rotate, wherein the pitch change axis extends perpendicular to a center axis of the gas turbine engine, the blade restraint includes a base coupled to the shank for rotation therewith, a first post that extends away from the base, and a second post that extends away from the base, the first post being spaced apart from the second post to define a blade receiver slot between the first post and the second post, wherein the first post is hook shaped to define a first relief slot that extends axially relative to the pitch change axis through the first post and opens into the blade receiver slot and the second post is hook shaped to define a second relief slot that extends axially relative to the pitch change axis through the second post and opens into the blade receiver slot, wherein the blade restraint includes a front face and a rear face spaced apart from the front face and the blade receiver slot, the first relief slot, and the second relief slot extend through the front face and the rear face of the blade restraint, wherein the first relief slot is L shaped and has an opening that faces the second post.

18. The variable pitch fan blade assembly of claim 17, wherein the first post includes a fixed end coupled to the base and a free end spaced apart from the fixed end and a thickness of the first post tapers down from the fixed end to the free end.

* * * * *